United States Patent Office 2,769,268
Patented Nov. 6, 1956

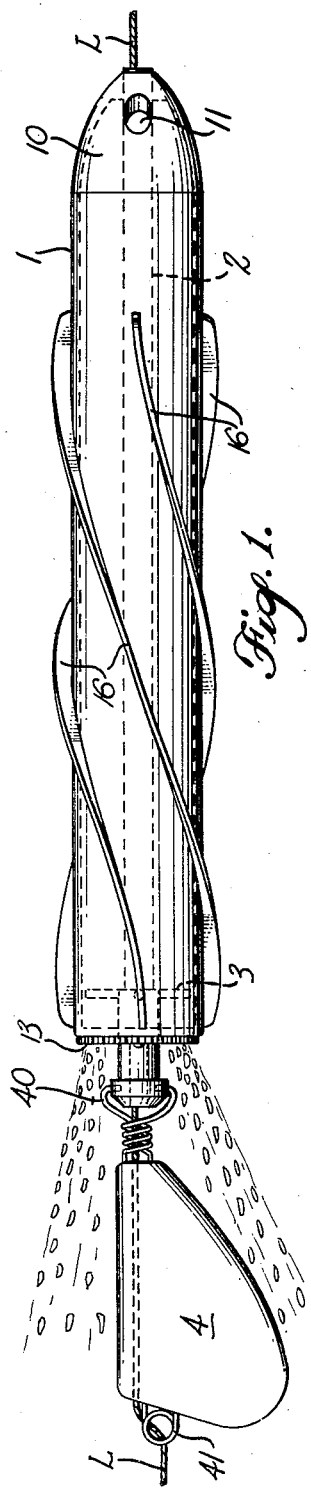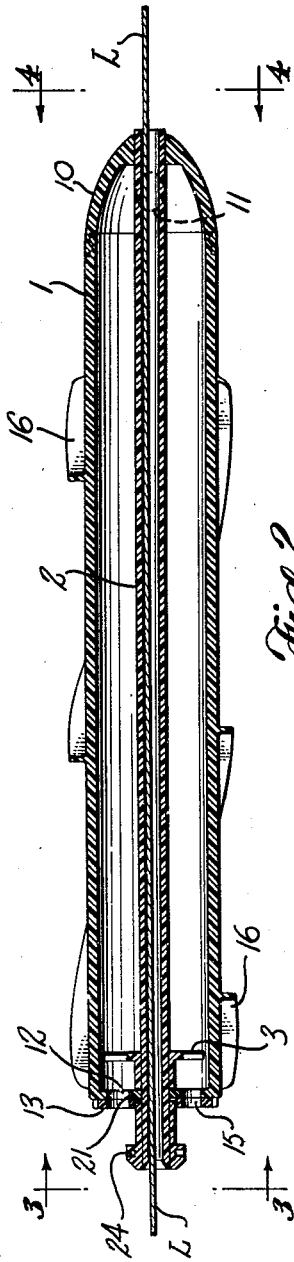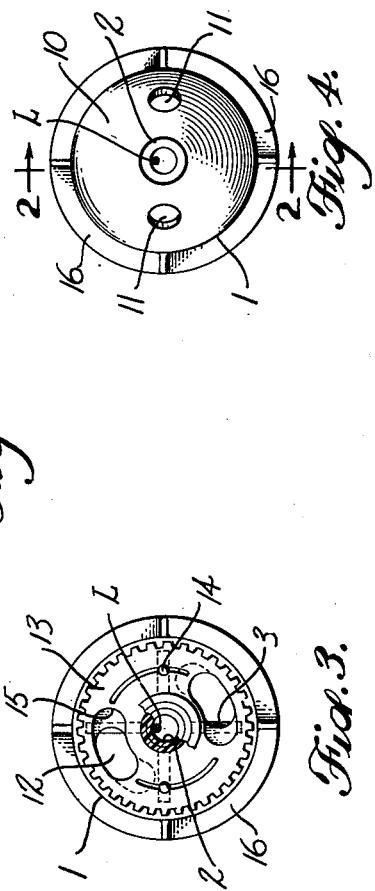

2,769,268

FISH LURES

Myron C. Miller, Seattle, Wash., assignor to Herring Magic, Inc., Seattle, Wash., a corporation of Washington Application May 17, 1954, Serial No. 430,320

4 Claims. (Cl. 43—42.06)

This invention relates to a fish lure designed to emit a trail of scales, being actual or simulated fish scales, when it is drawn through the water, as in trolling.

Salmon, in particular, feed upon small herring. They follow schools of herring, and while they may not, in a dash through a school of the smaller fish, actually seize any herring, they will in all probability injure a few. These injured herring, being rendered less agile, are subsequently unable to escape the salmon, and so furnish food for the salmon. The presence of injured herring is signalled by the presence in the water of scales dislodged from the herring by the salmon's rush, and it is by the presence of these scales and by following the trail of scales left by an injured herring that the salmon is able to locate the injured herring and to devour it.

The present invention has as its generally objective the simulation of a trail of scales such as an injured herring would leave, whereby to attract salmon to the lure proper, at which it will strike because of the inherent attractiveness of the lure, either the container of this invention, or a separate lure used in conjunction therewith.

It is a further object of the invention to provide a lure of the general nature indicated, which will be of simple construction, which will include revoluble and non-revoluble parts, which will be provided with means for effecting revolution of the one and for preventing revolution of the other, and which in general will be of a nature to be fitted upon or to a fishing line, and readily filled with herring scales or the like, so that they will be emitted along with the water which is permitted to pass through the container for the scales, together with means for regulating the effective size of the exit apertures, and thus to regulate the rate at which the scales are emitted.

It is also an object to provide stirrer means within such a container to prevent the packing of the scales in the vicinity of the exit aperture, and to insure that they will pass out sufficiently freely from the exit apertures.

With such objects in mind, and others as will appear hereinafter, the present invention comprises the novel lure and the novel combination and arrangement of the parts thereof, as shown in the accompanying drawings in a presently preferred form, and as will be more fully described hereinafter and claimed in the appended claims.

Figure 1 is a general side elevational view of the lure in operation.

Figure 2 is a general axial sectional view through the lure on the line 2—2 of Fig. 1.

Figure 3 is a rear end view, the viewpoint being indicated at 3—3 in Figure 2, and Figure 4 is a front end view, as indicated at 4—4 in Figure 2.

The lure includes a container 1, of elongated form, and preferably of generally cylindrical shape, within which the scales to be emitted are contained. This container may be provided with a removable cap 10 at its front end, and its rear end is closed. However, both the front and rear ends are apertured, the front end having the entrance apertures 11 opening forwardly, and the rear end having the exit apertures 12. Preferably these exit apertures are of variable effective size, and this is accomplished in any suitable way, as by mounting a disk 13 rotatively about the axis of the container 1, for example by the arcuate slot and pin connections at 14, this disk having apertures 15, which cooperate with the apertures 12 to vary the effective size of the latter.

It is intended that the container 1 shall revolve about its axis when drawn through the water. Not only will this increase its attractiveness and its simulation of a herring, if made of transparent material, but this helps to keep its contents stirred up, as will shortly appear. It is therefore provided with a spindle 2 about which it may revolve. Preferably this spindle is in the form of a nonrevoluble hollow tube, extending completely through the axis of the container 1 and protruding at the rear end of the container. It is provided with a shoulder 21, whereon the rear end of the container bears. In order to accomplish the revolution of the container, it is provided with water-reaction vanes of any suitable type, as indicated at 16, so that when the cylinder is drawn through the water it will be revolved about and relative to the spindle 2.

The spindle 2 should not be permitted to revolve. It serves as a guide for the line L and its revolution would tend to twist the line, but furthermore, the spindle is depended upon to support generally radially projecting stirrer arms 3 within the container and adjacent its rear end apertures 12, which as the container 1 revolves cause the fish scales that would otherwise tend merely to revolve with the container, to be stirred up by the nonrevolubly mounted stirrer arms 3, so that they will pass out through the apertures 12 with the water which enters at the front end apertures 11 and which passes through the container and through the mass of scales therein.

There is nothing in the spindle itself, nor in the stirrer arms 3, which will prevent their revolution with the container 1. It is, therefore, necessary to provide means which will prevent revolution of the spindle as the lure is drawn through the water. To this end, a weight mass 4 is employed. This weight mass is provided at its forward portion with means for securing it nonrevolubly with respect to the protruding rear end of the spindle. Such means may be conveniently formed as spring-mounted and inwardly urged hooks or tongs 40, the inwardly directed ends of which are received within radially directed apertures 24 at the rear end of the spindle, exteriorly of the container. Moreover, the weight mass 4 is provided with means, such as the spring clip 41 of known form, for detachably engaging the line L therewith. These two weight mass supporting elements 40 and 41 are both arranged near the upper portion of the weight mass, well above its center of gravity, and thereby insure that the weight mass 4 will be held pendently in the water, and therefore will hold the spindle 2 against revolution.

The container 1 is desirably made of transparent plastic material, whereby the contained scales will be visible through it, and thus it will serve not only by the trail of scales which it emits, but also by its own inherent appearance, and by its revolutionary movement, to attract the fish. Also, if desired, a scent may be associated with the scales or included within and emitted from the container, to serve as an additional attracting agent. It is to be emphasized, however, that the use of any such scent is of secondary importance, and that the primary function of the lure is to contain and gradually emit a trail of scales.

The operation of the device, it is believed, will be apparent. The container is filled with scales, either actual herring scales or simulations thereof, and the container is then trolled or otherwise drawn through the water, causing water to enter by the apertures 11 at the front end of the lure, to pass through the container and through the mass of scales within it, and to be emitted in regulated quantities, with regulated quantities of the scales, by way of the apertures 12, the effective size of the latter being regulated as desired by rotative adjustment of the disk 13. As the lure is drawn through the water, the weight mass 4 attached to the protruding rear end of the spindle 2 prevents the spindle from rotating, wherefore the revolution of the container 1 about the spindle causes the stirrer arms 3 to stir up the mass of scales and prevent their packing in the vicinity of the exit apertures at the rear end. The container can readily be made of a size, and the effective size of the exit apertures can be small enough, that one filling of scales will last from one-half hour to one hour.

The hook may be and usually would be attached to the line L to the rear of the weight mass 4.

I claim as my invention:

1. A fish lure, for dispensing a trail of scales, comprising an elongated hollow container having water inlet apertures at its front end and exit apertures at its rear end, a spindle disposed axially within the container about which the container may revolve, water-reaction vanes on the exterior of said container to effect its revolution when drawn through the water, means to support the container from a line for drawing it through the water for entrance of water through its front end apertures and for exit of the water and scales from within the container through its rear end apertures, and generally radially directed stirrer arms on the spindle, within the container and adjacent the rear end apertures.

2. A fish lure as in claim 1, including means connected to the spindle to hold the same and the stirrer arms against rotation about the axis, notwithstanding revolution of the container.

3. A fish lure as in claim 1, including a closure rotatably mounted on and frictionally held to the rear end of the container, and apertured similarly to the latter's rear end apertures, for adjustment of the effective size of such apertures.

4. A fish lure for dispensing a trail of scales, comprising an elongated hollow container for such scales having water inlet apertures at its front end and exit apertures at its rear end, a tubular spindle extending axially through the container and protruding rearwardly beyond the end thereof upon which spindle the container is revolubly mounted, the spindle constituting a guide for a line passing through the spindle's bore, water-reaction vanes on the exterior of said container to effect its revolution when drawn through the water, generally radially directed stirrer arms upon the spindle and within the container, a weight mass, means to engage the forward portion of the weight mass nonrevolubly relative to the protruding rear end of the spindle, means to engage the rear portion of the weight mass with the rearwardly trailing portion of the line, said latter two means being so located, relative to the center of gravity of the weight mass as to support the latter pendently and thereby to retain the spindle against revolution as the lure is drawn through the water.

References Cited in the file of this patent

UNITED STATES PATENTS

| 651,926 | MacMichael | June 19, 1900 |
| 676,391 | Cope | June 11, 1901 |
| 2,037,116 | Burdick | Apr. 14, 1936 |
| 2,078,816 | Shenitz | Apr. 27, 1937 |
| 2,085,096 | Hansen | June 29, 1937 |
| 2,465,127 | Stark | Mar. 22, 1949 |
| 2,490,507 | Brown | Dec. 6, 1949 |

FOREIGN PATENTS

| 248,547 | Great Britain | Mar. 11, 1926 |